Figure 6:
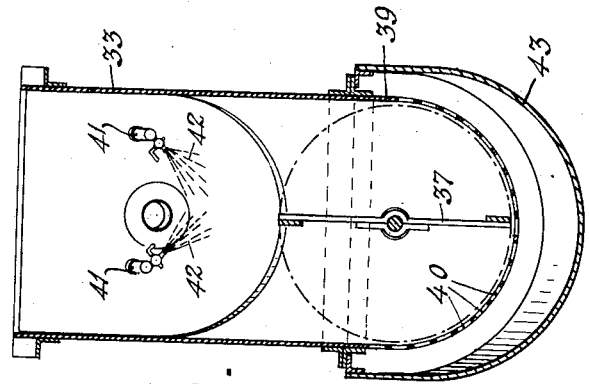

Feb. 19, 1935.   F. L. CHAPPELL   1,992,002
PROCESS FOR THE MANUFACTURE OF CASEIN
Filed Jan. 21, 1933   3 Sheets-Sheet 1
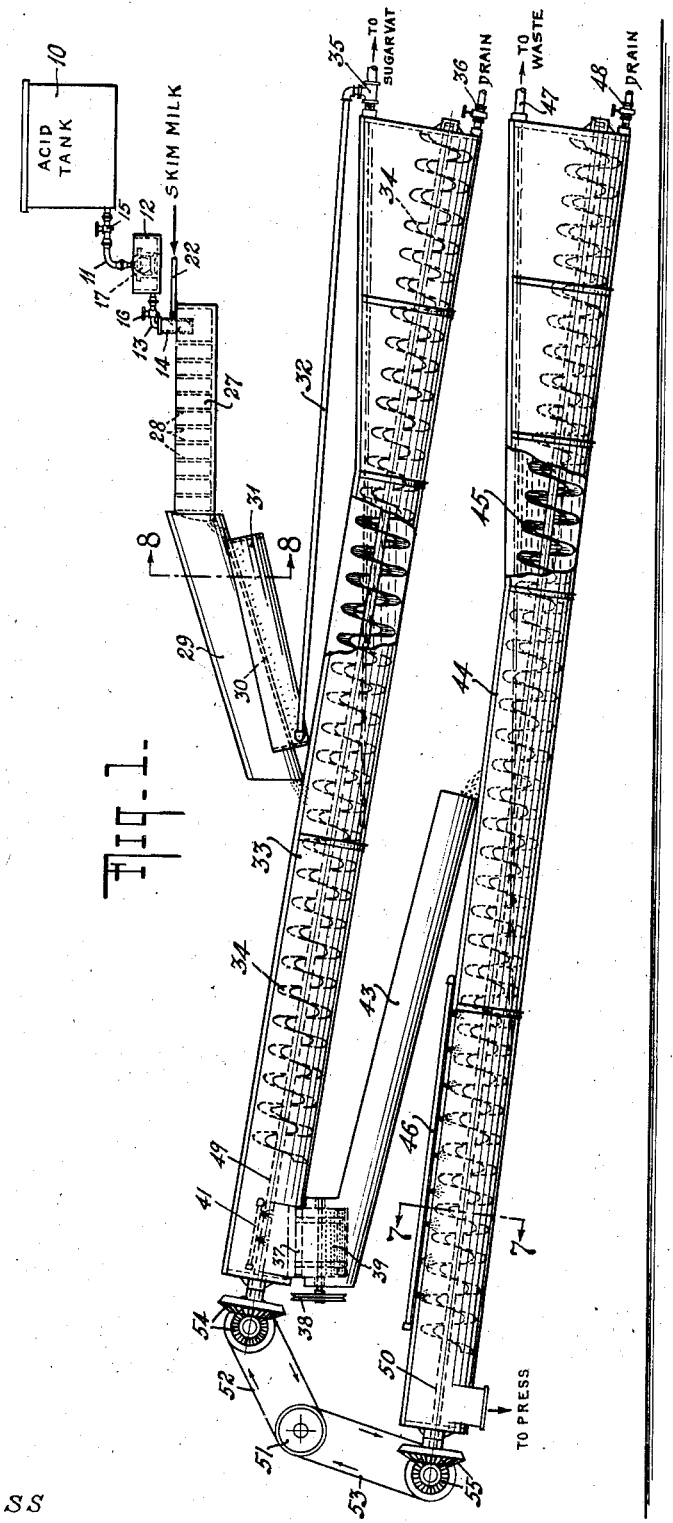
WITNESS
G. V. Rasmussen
INVENTOR
FRANK L. CHAPPELL
BY
ATTORNEYS

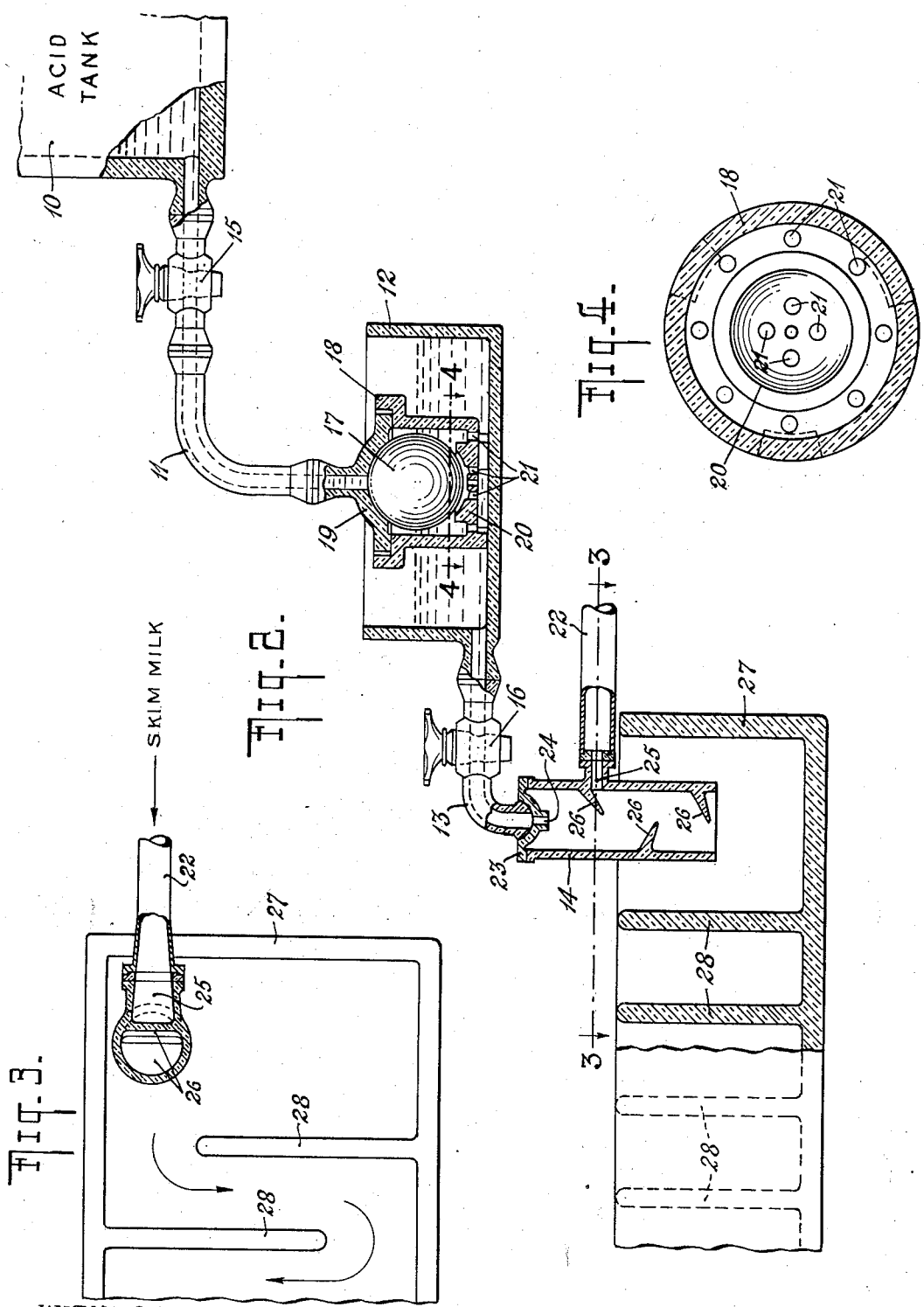

Feb. 19, 1935.  F. L. CHAPPELL  1,992,002
PROCESS FOR THE MANUFACTURE OF CASEIN
Filed Jan. 21, 1933  3 Sheets-Sheet 3

WITNESS
G. V. Rasmussen

INVENTOR
FRANK L. CHAPPELL
BY
ATTORNEYS

Patented Feb. 19, 1935

1,992,002

UNITED STATES PATENT OFFICE 1,992,002

PROCESS FOR THE MANUFACTURE OF CASEIN

Frank L. Chappell, Hobart, N. Y., assignor to Sheffield Farms Company, Inc., New York, N. Y., a corporation of New York Application January 21, 1933, Serial No. 652,820

6 Claims. (Cl. 99—11)

My invention relates to a process for the preparation of acid precipitated casein and has for its special object the production of a casein especially low not only in ash content but also in acid content. A low ash content is desirable in a casein, especially when this is to be used for coating paper, because the lower the ash content the lower is the viscosity; and a low acid content is desirable so as to diminish the amount of neutralizing agent which must thereafter be used, thus not only calling for the use of less of such neutralizing material, but also creating less foaming, and therefore less liability of the formation of pinholes when the casein is used for coating paper. Casein having a high ash content, but a low acid content, has a higher viscosity than deemed desirable, especially in the paper industry, whereas casein having a low ash content but a high acid content has a viscosity deemed too low, especially in the paper industry. Moreover, by the use of my process less acid need be used in the manufacture of the casein thus resulting not only in a saving of acid but also in the recovery of a larger proportion of the casein, it being well known that the more acid is used, the more casein will go into solution and therefore be lost in the whey or wash water.

In carrying out my invention, I add the necessary quantity of acid (as distinguished from adding the acid gradually to the milk) to skim milk under conditions which immediately bring about a very intimate admixture thereof, the milk being heated to such a temperature and the proportion of acid (preferably muriatic) being such that the resulting curd tends to form relatively small granules known to the art as grain curd, care being taken not to add so much acid as to cause loss of casein by its going into solution. The necessary temperature and acid proportion for producing curd, and especially grain curd, are well known to those skilled in the art, but in my process substantially less acid should be used than that hitherto deemed necessary, as it is one of the advantages of such process that it may be worked with about one-third less acid than heretofore; the desirable proportion can readily be determined by simple experiment.

In accordance with my process I mix the milk and the acid as intimately and as rapidly as possible, the amount of acid used being all that is needed for the precipitation of the casein, i. e. so as to cause a substantially completely reactive admixture. I have not as yet found it possible to produce this intimate admixture with sufficient rapidity in a tank, and therefore cause the milk to flow in a relatively rapid stream and cause the acid, in the form of a stream, to impinge upon such stream of milk, this taking place in a space sufficiently confined to force the two liquids into immediate and intimate admixture, the entire operation taking place under such conditions that the reaction between the acid and the milk has been completed, or at least substantially completed, before the mixture has passed by gravity or otherwise out of such confined space. As will, however, be obvious to any one skilled in the art, the particles of curd formed by the reaction, will be prevented from coalescing by the violent agitation produced by forcing the milk and acid into immediate and intimate admixture. I then preferably separate the resulting curd and whey as soon as possible, as the whey will have taken some of the acid into solution and such acid would, within a short time, cause some of the resulting curd to go into solution and thus be lost. I also preferably wash the curd as soon as possible after the whey has been drained therefrom, so as to prevent loss of curd by solution in the remaining whey.

In my preferred method, therefore, I first cause the whey to flow away from the casein, preferably by gravity, and then, after the larger portion of the whey has drained off, I wash the casein while agitating it under conditions which prevent as far as possible a loss thereof by flowing away in the wash water. Therefore in my preferred method, I gradually lift the casein, while agitating it by means of a helicoid ribbon, under circumstances which permit the whey or the wash water to drain therefrom without permitting it to carry away a substantial amount of casein particles, and also preferably under conditions which permit the recovery of such casein as may have settled in the whey or the wash water.

Figure 8:
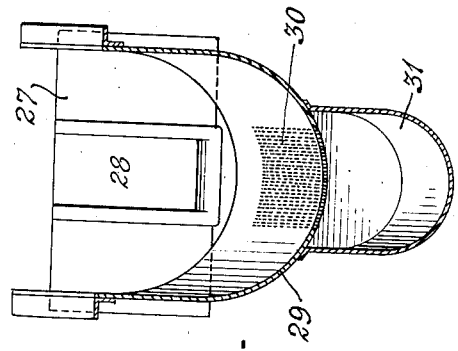
Figure 5:
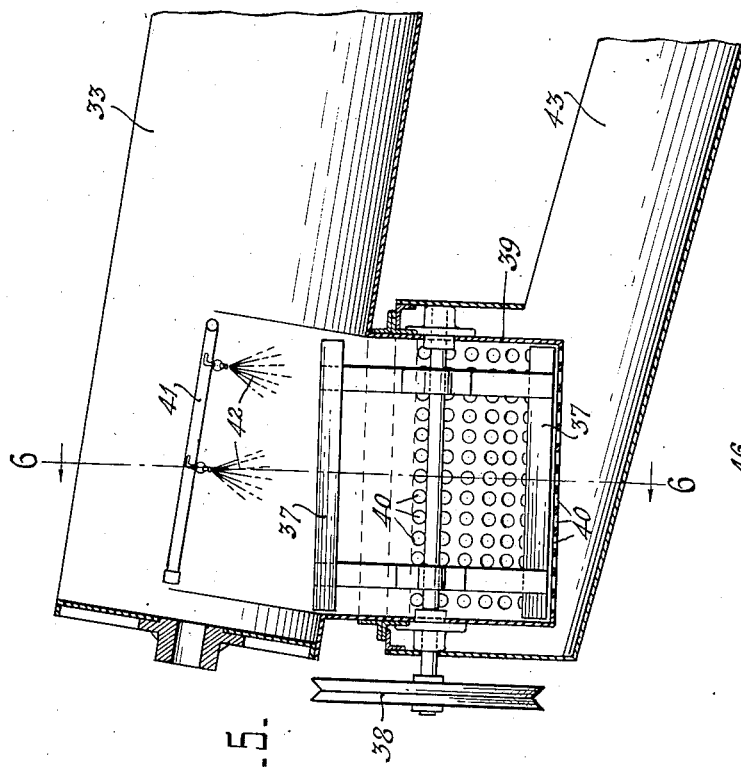
Figure 7:
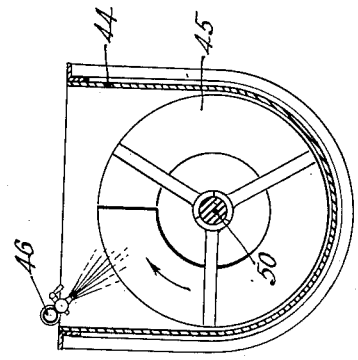

In the drawings accompanying the application, which illustrate one form of an apparatus suitable for my purpose, Fig. 1 is a side elevation of one form of a complete apparatus drawn to scale embodying my invention and for carrying out the process hereinabove described; Fig. 2 is an enlarged detail of so much of the apparatus as is used for mixing the milk and the acid; Fig. 3 is a section of the line 3—3 of Fig 2; Fig. 4 is a section on the line 4—4 of Fig. 2 showing a detail of the float flow controller for keeping constant the flow of acid; Fig. 5 is an enlarged detailed view, partially in cross-section of a breaker and associated parts, by means of which wash water is applied to the casein as it leaves the upper of the two conveyors; Fig. 6 is a cross-section on the line 6—6 of Fig. 5; Fig. 7 is a cross-section on the line 7—7 of Fig. 1; and Fig. 8 is a cross-section on the line 8—8 of Fig. 1.

10 is an acid storage tank from which acid flows through a pipe 11 to a tank 12 (see Fig. 2), from which in turn it flows through pipe 13 into a mixing chamber 14. The flow of the acid is controlled by cocks 15 and 16 and is kept constant by means of a flow controller which may be of any suitable construction, but, as shown, consists of a ball valve 17 mounted in a housing 18 and adapted to be seated, as the case may be, against a head 19 and a base 20 having perforations 21. As this type of controller is well known in the art, its operation need not be described.

Milk is introduced through a pipe 22 into the mixing chamber 14 to be therein intimately admixed with the acid.

The mixing chamber 14, in the construction shown, consists of a cylindrical vessel of any suitable acid-resisting material and is provided with a cover 23 having a perforation 24 through which acid may enter and a perforation 25 through which the milk may enter; also with baffle plates 26, 26 so arranged as to assist in thoroughly mixing the acid and the milk before these substances pass out of the bottom of the mixer. The aperture 25 is preferably so constructed as to pass the milk into the mixer in a ribbon stream, thus presenting the largest possible surface to the inflowing acid (see Fig. 3).

From the bottom of the mixing chamber 14, the intimately admixed and substantially reacted milk and acid drop into a mixing box 27 provided with baffles 28 to force the milk to flow through the box in a sinuous path, thus producing sufficient agitation to permit the curd particles to coalesce into large lumps, but not so much agitation as to prevent them from doing so. Preferably the milk in the mixing box should not be permitted to rise to a level above or in any event to a level much above the exit level of the mixing chamber 14. In connection with the use of this apparatus, the temperature and proportions of the acid and the milk are preferably such that the reaction between them is as complete as possible before the liquid leaves the mixing chamber 14, so that in any event the reaction has been entirely completed and the curd has coalesced into large lumps before the liquid leaves the mixing box 27. In other words, the milk has already become converted into curd lumps and whey before the liquid leaves the mixing box. This mixture flows down a chute 29 (Figs. 1 and 8) a portion of whose bottom is perforated or consists of a fine screen 30 (Fig. 8), so as to permit a substantial proportion of the whey to separate from the curd and to fall into a lower chute 31 from which it flows through pipe 32 out to the sugar vat, i. e. the vat in which the milk sugar is thereafter recovered. The curd and the remainder of the whey flow out at the bottom of the chute 29 into a screw conveyor consisting of a trough-like housing 33 (open at the top—see Fig. 7), and a conveyor flight in the form of a helicoid ribbon 34. The conveyor is tilted so as to permit the whey to flow downwardly, and the helicoid ribbon is so actuated as to lift the curd. The lower portion of the trough 33 is made of gradually increasing height and is closed at its end so as to accommodate a large body of whey as indicated by the liquid level line shown in Fig. 1. The upper portion of the lowermost end of such trough is provided with a pipe connection 35 to pipe 32, so that the whey may flow therethrough to the sugar vat and the lowermost portion is provided with a drain cock 36. If a substantial proportion of the whey were not drained off through screen 30, there would be danger of too rapid a flow of whey through the lower portion of trough 33, and out by connection 35, with the consequent danger of carrying away a substantial amount of curd.

After the larger portion of the whey has drained off into the lower portion of the trough 33, the casein which has been lifted by the helicoid ribbon, housed within such trough, to the upper end thereof is washed, while being agitated, by the breaker illustrated in enlarged detail in Fig. 5, such breaker comprising a semi-cylindrical screen 39 provided with perforations 40 and a paddle 37, revolved by means of pulley 38 driven from any suitable source. A pipe 41 is mounted within the upper end of the trough 33, streams of water 42 being directed from such pipe onto the curd fed into the screen 39 by the helicoid ribbon 34.

The curd dropping or wiped through the perforations 40 of the screen 39 flows, with the water intermingled therewith, through a chute 43 to a point approximately midway the length of a second trough 44, substantially similar to the trough 33 and having a helicoid ribbon conveyor 45 extending substantially throughout its length.

The mixture which flows through the chute 43, and which consists of curd, water, and so much of the whey as has not been separated from the curd in the chute 29 and the trough 33, thus flows into a large body of water in the lower portion of the trough 44, the helicoid ribbon 45 being effective to lift the curd toward the upper portion of the trough, in which upper portion the curd is sprinkled with water from a pipe 46 disposed along the open top of the trough. The curd is permitted to drop from the extreme upper end of the trough directly onto a casein press or into a container, whence it may be transferred to a press.

It will be noted that the lower portion of the trough 44, like the lower portion of the trough of the upper conveyor flight, is made of gradually increasing height and is closed at its ends, the upper portion of the lowermost end of such trough being provided with a pipe connection 47 through which the water is allowed to escape. At the lowermost portion of the trough 44, is provided a drain cock 48, for use when the trough is to be cleaned.

The two flight conveyor shafts 49 and 50 may be driven from a single source, for instance, a pulley 51 connected by belts 52 and 53 to sets of gears 54 and 55 respectively.

All the parts of the apparatus are, of course, suitably supported, but for the sake of clarity no showing has been made of any supports.

All of the portions of the apparatus shown in Fig. 2 are preferably made of acid resisting material, for instance, earthenware.

The drawings show the apparatus with the conveyors and screens in proper proportion and drawn to scale, the total length of the upper trough being approximately 32 feet and the total length of the lower trough being approximately 37 feet.

I am, of course, not restricted to the use of an apparatus of these proportions or even of the particular construction illustrated, but so far as I know it illustrates the most efficient structure of an apparatus for carrying out my invention.

The speed of rotation of the paddle 37 within the screen 35 is preferably so regulated that the curd is made as accessible as reasonably possible to the wash water flowing from pipe 41.

The fundamental advantage of my process is that I may use less acid, and milk at a higher temperature, than regarded necessary when producing curd and especially grain curd. I obtain an end product of a lower ash content and lower acid content than that of even ordinary grain curd.

I have found that because I mix the acid and the milk almost instantaneously and very thoroughly, I need less acid than is required by the ordinary grain curd process, this not only resulting in a saving of acid, and in a lower acidity of the final product, but in a smaller loss of curd by redissolution. It must be kept in mind that not all of the acid will react with the casein in the milk, as some of the acid goes into and remains in solution in the whey, and that the precipitated curd, especially insofar as it is present in very fine particles, readily goes into solution even in weak acid.

As skim milk produced at different seasons of the year, or under different conditions, or when stored for a shorter or a longer time, is itself of varying degrees of acidity, and as the batches of milk introduced into the mixing chamber in a single day vary in acidity and it is not convenient to determine, by prior test, how much acid should be added to the milk, I determine and regulate the amount of acid to be used by testing the acidity of the whey after it has left the mixing chamber, and preferably at about the point at which it is about to flow out of the mixing box 27 into the chute 29. Roughly speaking, the acidity of the whey should be somewhere in the neighborhood of 3.8 cc. to 4.6 cc., this number being determined by the number of cubic centimeters of sodium hydroxide $\frac{1}{10}$ normal solution (N/10) used to neutralize 9 cc. of whey, or by testing the whey with a standard quinhydrone hydrogen ion indicator. The amount of acid supplied is regulated by cock 16 in such a manner as to keep the acidity of the whey at the desired point. As hereafter explained, the acidity should be kept at a point which is determined by the temperature of the milk used and the desired ash content and acid content of the final product.

When casein is to be precipitated from milk, the milk is usually heated. In the ordinary vat process it is heated to about 120° to 125° F., but, if grain curd is to be produced, then at a temperature of about 93° F. (Sutermeister, Casein & Its Industrial Applications, pp. 94 and 84), the higher the temperature of the milk, other things being equal, the higher the ash content and viscosity of the resulting product, especially when muriatic acid is used (Same, p. 94). While the use of a comparatively low temperature, f. i. 93° F., tends to produce a curd having a more granular character, thus permitting more ready washing, such curd is of softer consistency and more readily goes back into solution in the acid whey and is more liable to deterioration by the acid therein. The use of my process calls for the same choice that must be made as in the processes of the prior art, namely whether a low ash content in the final product is to be obtained at the sacrifice of curd lost by redissolution, or a higher yield is to be obtained but of a higher ash content. However, in my process I may use less acid, and have the milk at a higher temperature, and still obtain a product containing less ash than with the best known prior art process using more acid, and milk of a lower temperature.

It is known that the more acid is used the less is the ash content of the final product, but it must be kept in mind, as already explained, that a lower ash content is obtained in this manner only at the sacrifice of a proportion (substantial from the commercial standpoint) of the curd by redissolution in the acid whey.

From what has been said hereinabove, it will be clear that the amount of acid used, and the temperature of the milk, will depend upon what end product is desired, and the exact proportions and temperatures can readily be ascertained by anyone skilled in the art who will make a few test runs and decrease or increase the acid or the temperature until the desired product is obtained. However, the following tables will illustrate in detail some of the results obtained by my process as compared with the results obtained by the best prior art method known to me.

I.

|   | Acidity of whey | Temperature of milk (F.) | Ash | Acidity of casein |
|---|---|---|---|---|
|   | cc. | ° | % | cc. |
| A | 4.84 | 106 | 1.75 | 2.3 |
| B | 4.68 | 106 | 2.25 | 2.8 |
| C | 4.74 | 106 | 1.70 | 2.3 |
| D | 4.60 | 106 | 1.85 | 2.3 |
| E | 4.64 | 106 | 1.85 | 2.3 |
| F | 4.62 | 104 | 2.05 | 2.4 |
| G | 4.70 | 104 | 1.60 | 2.2 |

II.

|   | Acidity of whey | Temperature of milk (F.) | Ash | Acidity of casein |
|---|---|---|---|---|
|   | cc. | ° | % | cc. |
| 1 | 4. | 108 | 1.55 | 1.2 |
| 2 | 4.6 | 108 | .75 | .9 |
| 3 | 3.8 | 110 | 1.10 | 1.1 |
| 4 | 4.6 | 108 | .60 | .9 |
| 5 | 4. | 100 | 1.25 | .9 |
| 6 | 4. | 112 | 1.30 | 1.0 |
| 7 | 4. | 120 | 1.35 | 1.6 |

In table I the results were obtained by the old tank method in which the acid was dropped into the tank containing the milk while the latter was rapidly stirred. The whey tested for acid was taken from the tank. After precipitation had been completed, the casein and whey were separated and the casein washed in an apparatus exactly like that shown in patent to Sheffield, No. 1,716,799, dated June 11, 1929, with the use of which apparatus I have had many years' experience and which I regard as resulting in the best product (i. e. lowest ash content) heretofore known in commercial manufacture of casein.

In Table II the results were obtained by means of the process and apparatus hereinabove described.

In both cases the acidity of the whey was determined in the manner hereinabove described (number of cc. of N/10 sodium hydroxide to 9 cc. of whey) and the acidity of the casein was determined by the number of cc. of N/10 sodium hydroxide used to neutralize 5 g. of casein.

Comparing by way of example item D of Table I with item 4 of Table II, it will be found that with whey of the same acidity, i. e. (other things being equal) with the same amount of acid added to the milk, I employ a temperature of 108° as against 106° of the best prior art example, and instead of obtaining a casein of a higher ash content, as should have been expected, I obtain a casein having an ash content of .60% instead of an ash content of 1.85%. The acidity of the final product obtained by my process was .9 cc. as against 2.3 cc. of the best prior art. This shows that so much of the acid as did not come out with the whey, and was not used in reacting the natural casein to convert it into precipitated casein, but remained attached to the curd, was more thoroughly washed away, although my washing process was conducted in only a single conveyor 37 feet in length instead of in two conveyors, each about 49½ feet in length, as in the Sheffield patent referred to (p. 2, 11. 42-3). The wash water is preferably heated to a temperature of from 60° to 80° F. but need not be acidulated.

While I may use acid of ordinary commercial strength, I prefer to dilute it to a third or a quarter of its strength with water so as to permit more ready regulation of the proportion of acid to milk in the mixing chamber 14 by means of cock 16. It will be noted that the mixing chamber 14 is provided with a cover 23, the acid being introduced through aperture 24 in such cover. The primary purpose of providing such a cover is to prevent air from being drawn into the mixing chamber, thus preventing foaming of the milk with resulting froth which would flow off on top of the whey and thus be lost and perhaps, by not drawing in air with the acid, permit a more intimate or rapid admixture of the milk and acid, as air held in the milk may escape therefrom because of the creation of a slight vacuum in the upper portion of the mixing chamber. In an apparatus having conveyors of the proportion of those shown in the drawings, I prefer to rotate the helicoid ribbon 34 at four revolutions per minute, and the helicoid ribbon 45 at two revolutions per minute. Thus in the upper trough 33 the more rapid rotation of the helicoid ribbon causes a more rapid separation of the curd from the whey, while in the lower trough 44 the slower rotation of the helicoid ribbon permits the curd to be subjected to the washing process for a longer time. It will be noted that the lower trough is tilted at such an angle that the casein will drop from chute 43 into a body of comparatively clean wash water and be agitated therein a considerable distance as it is being lifted out of such water.

The rotation of the helicoid ribbons in both troughs is, however, so slow that any casein particles which are carried along by the whey or the water may settle to the bottom and then be lifted upward and thus recovered.

While some of this improved result may be ascribed to my improved apparatus for washing the casein, only a comparatively small proportion of such advantage can be attributed thereto, especially when the fact is taken into consideration that my casein, mixed with water, is dropped into the center portion of the trough 44 and the large majority is immediately lifted out of the wash water. It is my theory, to which I should, however, not desire to stand committed, that the intimate and immediate admixture of all the necessary acid with the milk in the mixing chamber 14 prevents acid not used in the reaction, but in solution in the whey, from becoming occluded within the curd, so that any acid carried along by the curd adheres only to the surface thereof and is washed away without any particular difficulty.

My process could therefore be used, even though not to the fullest advantage, if the resulting curd and whey were collected in a tank and only from time to time drawn from such tank into a suitable washing apparatus or even washed in such tank.

It is, of course, obvious that any mechanical means for bringing about the intimate admixture of milk and acid may be used and that my inventive thought may be employed, even though not to its fullest advantage, if the admixture is not as intimate as hereinabove described; for instance, (in a T-pipe) the milk may be caused to flow under pressure through one pipe and the acid may be caused to flow through another pipe, the two pipes communicating at approximately the same point with a third pipe through which the mixture is allowed to flow, provided an intimate admixture takes place approximately at the point where the pipes meet.

I claim:

1. The process of manufacturing an acid precipitated casein of relatively low acid and ash content, which consists in mixing skim milk while flowing in a stream with a stream of acid under conditions creating agitation of such a degree of violence as to cause a rapid and substantially completely reactive admixture of such milk and acid and to prevent the resulting curd particles from coalescing, and, after the reaction has been substantially completed, separating the resulting curd from the whey.

2. The process of manufacturing acid precipitated casein of relatively low acid and ash content, which consists in passing a stream of skim milk into a confined space, flowing a stream of acid into the milk while the latter is in such confined space, the size of the space and the energy of the stream of milk being such as to create an agitation of such a degree of violence as to cause a rapid and intimate substantially completely reactive admixture of such milk and acid and to prevent the resulting curd particles from coalescing, and after the reaction has been substantially completed, separating the resulting curd from the whey.

3. The process of manufacturing an acid precipitated casein of relatively low acid and ash content, which consists in mixing skim milk while flowing in a stream with a stream of acid under conditions causing agitation of such a degree of violence as to cause a rapid and intimate substantially completely reactive admixture of such milk and acid and to prevent the resulting curd particles from coalescing, and, after the reaction has been substantially completed, agitating the reaction products gently to cause the curd particles to coalesce into lumps, separating the curd from the whey and washing the curd.

4. The process of manufacturing an acid precipitated casein of relatively low acid and ash content, which consists in mixing skim milk while flowing in a stream with a stream of acid under conditions causing agitation of such a degree of violence as to cause a rapid and intimate substantially completely reactive admixture of such skim milk and acid and to prevent the resulting curd particles from coalescing, and, after the reaction has been substantially completed, flowing the reaction products gently in a sinuous path so as to cause the curd particles to coalesce into lumps, separating the curd from the whey and washing the curd.

5. The process of manufacturing acid precipitated casein of relatively low acid and ash content, which consists in passing a stream of skim milk into a confined space, flowing a stream of acid into the milk while the latter is in such confined space, the size of the space and the energy of the stream of milk being such as to create an agitation of such a degree of violence as to cause a rapid and intimate substantially completely reactive admixture of such milk and acid and to prevent the resulting curd particles from coalescing, and, after the reaction has been substantially completed, removing the reaction products from such confined space, agitating the reaction products gently to cause the curd particles to coalesce into lumps, separating the curd from the whey and washing the curd.

6. The process of manufacturing acid precipitated casein of relatively low acid and ash content, which consists in passing a stream of skim milk into a confined space, flowing a stream of acid into the milk while the latter is in such confined space, the size of the space and the energy of the stream of milk being such as to create an agitation of such a degree of violence as to cause a rapid and intimate substantially completely reactive admixture of such milk and acid and to prevent the resulting curd particles from coalescing, and, after the reaction has been substantially completed, removing the reaction products from such confined space, flowing the reaction products gently in a sinuous path so as to cause the curd particles to coalesce into lumps, separating the curd from the whey and washing the curd.

FRANK L. CHAPPELL.